Aug. 28, 1934.  A. Y. DODGE  1,971,602
BRAKE
Filed Nov. 19, 1927
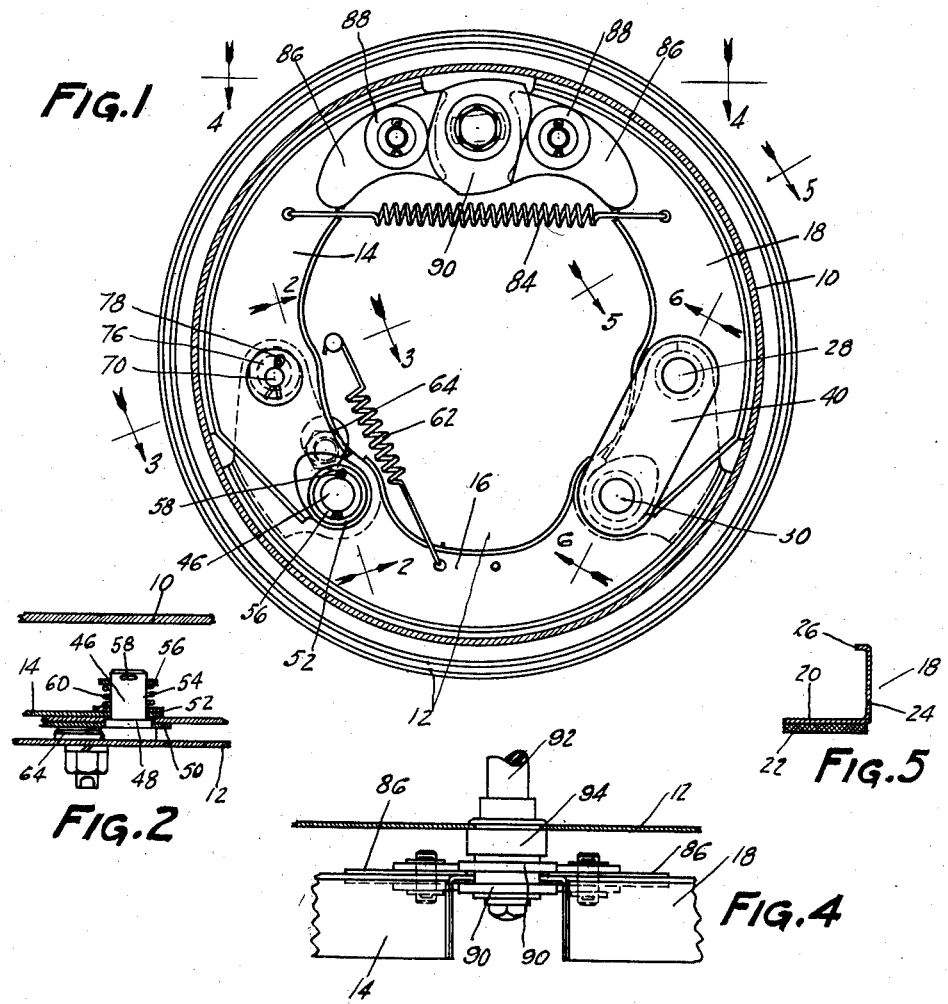
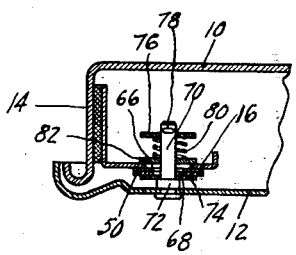
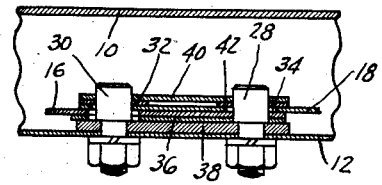
INVENTOR
ADIEL Y. DODGE
BY
ATTORNEY Patented Aug. 28, 1934

1,971,602

UNITED STATES PATENT OFFICE 1,971,602

BRAKE

Adiel Y. Dodge, South Bend, Ind., assignor to Bendix Brake Company, South Bend, Ind., a corporation of Illinois Application November 19, 1927, Serial No. 234,310

9 Claims. (Cl. 188—78)

This invention relates to brakes, and is illustrated as embodied in an internal expanding brake for an automobile. An object of the invention is to so arrange the brake to permit the use of a simplified form of shoe, preferably stamped from sheet steel in one piece, in which the stiffening web of the shoe is on the side of the braking flange next to the backing plate. This permits the use of very short brake anchors, etc., since the shoe webs are immediately adjacent the backing plate.

Various features of novelty relate to anchoring overlapping parts of the shoes, to a novel articulation connecting two of the shoes, to a new arrangement of steady rest for the shoes, to a roller mounting at the end of the shoe, and to other new and desirable structural features which will be apparent from the following description of one illustrative embodiment shown in the accompanying drawing, in which:

Figure 1 is a vertical section through the brake, just inside the head of the brake drum, showing the brake shoes in side elevation;

Figure 2 is a partial section on the line 2—2 of Figure 1, showing the articulation between two of the shoes;

Figure 3 is a partial section on the line 3—3 of Figure 1, showing a steady rest;

Figure 4 is a partial section on the line 4—4 of Figure 1, showing the shoes and the brake-applying means in top plan;

Figure 5 is a section through one of the shoes, on the line 5—5 of Figure 1; and Figure 6 is a partial section through the brake anchors, on the line 6—6 of Figure 1.

In the arrangement selected for illustration, the brake includes a rotatable drum 10, at the open side of which is a backing plate 12, and within which are arranged three novel brake shoes 14, 16, and 18, commercially known as the "primary", "secondary", and "auxiliary" shoes, respectively. Each shoe is preferably drawn or stamped from sheet steel, with the body of the shoe all in one piece and generally L-shaped in cross-section, as shown in Figure 5. This gives a braking flange 20 carrying suitable friction lining 22, at one side of which, on the side next the backing plate, is the stiffening web 24, preferably reinforced against buckling by a short lateral flange 26 at its inner edge.

Shoes 16 and 18 overlap at their adjacent ends, the web of shoe 16 being extended as an anchor arm past the end of the friction face of shoe 18 and anchored on a pivot 28, and the web of shoe 18 being extended as an anchor arm past the end of the friction face of shoe 16 and anchored on a pivot 30. The anchor arm portion of the web of shoe 18 is provided with a washer 32 welded to its side and extending the bearing on the pivot 30, and with a relatively large opening 34 giving ample clearance to the pivot 28.

Shoe 16 is provided with a reinforcing plate 36 welded to its side, and extending the bearing for pivot 28, and slidably resting against a heavy reinforcing plate 38 connecting and bracing the anchor pins 28 and 30. A tie plate 40 may be pressed over the ends of anchor pins 28 and 30, a spring washer 42 on pivot 28 compensating for washer 32. It will be noted that since the webs of shoes 16 and 18 are immediately adjacent the backing plate, the anchors 28 and 30 may be very short, thus minimizing the overhang and increasing the strength.

Shoes 14 and 16 are connected by a floating pivot 46 having a head slidably engaging the backing plate. Pivot 46 has a large-diameter portion 48 forming a collar adjacent the head, and on which shoe 16 is mounted. At this end, shoe 16 is reinforced by a plate 50 welded to the backing-plate side of its web, and serving to increase the width of the bearing on pivot 46. Shoe 14, to which a washer 52 is welded to increase the bearing surface, is mounted on a smaller-diameter part 54 of the pivot 46, thus resting against the collar 48 so that it does not bind against shoe 16. Pivot 46 is provided with a stop at its end, for example, a washer 56 held by a cotter pin 58, and a coil spring 60 is sleeved on the pivot and held under compression between the stop 56 and the shoe 14. An auxiliary return spring 62, connected at one end to the backing plate and at the other end to shoe 16, urges the head of pivot 46 against an adjustable eccentric stop 64 to fix the idle or released position of shoe 16.

Shoes 14 and 18 are preferably mirror images of each other, so that the shoe 14 of a left brake will be interchangeable with the shoe 18 of a right brake, and the shoe 18 of a left brake will be interchangeable with the shoe 14 of a right brake. The ends of shoe 16 are so made that the shoe is symmetrical with respect to the vertical center line of the brake, and may be turned end for end according to whether it is for use in a left brake or a right brake.

Shoe 14, therefore, is formed with an opening 66 corresponding to the opening 34 of shoe 18, while shoe 16 has at its left end an opening 68 registering with the opening 66 and corresponding to the opening pivoted on anchor 28. Advantage may be taken of these registering openings to provide a novel steady-rest for shoes 14 and 16. This steady-rest is shown as including a post 70 carried by the backing plate and projecting through the openings, and which has a collar 72 engaging the backing plate and against which a washer 74 rests, shoe 16 being in sliding engagement with this washer. A stop is provided at the end of post 70, for example in the form of a washer 76 held by a cotter pin 78, while a coil spring 80 sleeved on post 70 is confined under compression between the stop 76 and a washer 82 slidably engaging shoe 14.

At their upper ends, shoes 14 and 18 are connected by a tension coil return spring 84, and they are also provided at their ends with reinforcing plates or stampings 86 welded to opposite sides of their webs. Preferably rollers 88 are mounted in pairs on opposite sides of the web of each of these shoes at its end, for engagement with cams 90 embracing the shoe ends between them, the cams being slotted to float on a flattened portion of a camshaft 92 journaled in a bearing 94 carried by the backing plate 12.

While one illustrative embodiment has been described in detail, it is not my intention to limit the scope of the invention to that particular embodiment, or otherwise than by the terms of the appended claims.

I claim:

1. A brake comprising, in combination with a drum and a backing plate at the open side of the drum, a pair of shoes each having a stiffening web at one side only immediately adjacent the backing plate and each with a braking flange extending laterally from said web away from the backing plate and engageable with the drum when the shoe is moved outward, the braking flanges of said shoes being arranged end to end and each of the stiffening webs at ends of the shoes projecting as an anchor arm overlapping part of the stiffening web of the other shoe, and anchoring means carried by the backing plate and engaging said anchor arms of the shoes.

2. A brake comprising, in combination with a drum and a backing plate at the open side of the drum, a pair of shoes each having a stiffening web at one side only immediately adjacent the backing plate and each with a braking flange extending laterally from said web away from the backing plate and engageable with the drum when the shoe is moved outward, the braking flange of of said shoes being arranged end to end and each of the stiffening webs at ends of the shoes projecting as an anchor arm overlapping part of the stiffening web of the other shoe, and anchoring pivots carried by the backing plate and on which said anchor arms are mounted.

3. A brake comprising, in combination with a drum and a backing plate at the open side of the drum, a pair of shoes each having a stiffening web at one side only immediately adjacent the backing plate and each with a braking flange extending laterally from said web away from the backing plate and engageable with the drum when the shoe is moved outward, the braking flanges of said shoes being arranged end to end, anchoring means acting on the ends of the webs of said shoes and connecting said stiffening webs to the backing plate, and applying means also acting on the webs of said shoes.

4. A brake comprising, in combination with a drum and a backing plate at the open side of the drum, a pair of shoes each having a stiffening web at one side only immediately adjacent the backing plate and each with a braking flange extending laterally from said web away from the backing plate and engageable with the drum when the shoe is moved outward, the braking flanges of said shoes being arranged end to end, and anchoring means acting on the ends of the webs of said shoes and connecting said stiffening webs to the backing plate.

5. A brake comprising, in combination with a drum and a backing plate at the open side of the drum, a pair of shoes within the drum having stiffening webs on the side next the backing plate and having braking flanges extending away from the backing plate, the stiffening webs overlapping at the end of the shoe, and an articulating pivot passing through the overlapping webs and having its end slidably engaging the backing plate.

6. A brake comprising, in combination with a drum and a backing plate at the open side of the drum, a pair of shoes within the drum having stiffening webs on the side next the backing plate and having braking flanges extending away from the backing plate, the stiffening webs overlapping at the end of the shoe, an articulating pivot passing through the overlapping webs and having a head on its backing plate end, a stop on the opposite end of the pivot, and a spring sleeved on the pivot and confined between the stop and said webs.

7. A brake comprising, in combination with a drum and a backing plate at the open side of the drum, a pair of shoes within the drum having stiffening webs on their sides adjacent the backing plate and having braking flanges extending away from the backing plate, the stiffening webs having overlapping portions, and a steady rest for said overlapping portions of the webs and which is carried by the backing plate.

8. A brake comprising, in combination, a pair of shoes overlapping for some distance at their ends, a pivot connecting the ends of one shoe to a part of the other shoe some distance from its end, and a steady-rest holding the end of said other shoe and also holding a part of said one shoe some distance from its end.

9. A brake comprising three shoes, each having a braking flange and a stiffening web at one side only of the braking flange to form a shoe body generally L-shaped in cross-section, the webs of the two end shoes overlapping opposite ends of the web of the center shoe.

ADIEL Y. DODGE.